United States Patent [19]

Robichaud

[11] E Re. 31,465

[45] Reissued Dec. 20, 1983

[54] COMPACTIBLE SHELTER

[75] Inventor: Vincent P. Robichaud, Westminster, Mass.

[73] Assignees: Eric A. Robichaud, Westminster; Edward R. Robichaud; Denis J. Arsenault, both of Fitchburg, all of Mass.

[21] Appl. No.: 891,950

[22] Filed: Mar. 30, 1978

Related U.S. Patent Documents

Reissue of:

[64] Patent No.: 3,995,649
Issued: Dec. 7, 1976
Appl. No.: 580,874
Filed: May 27, 1975

[51] Int. Cl.[3] ..... A45F 1/16

[52] U.S. Cl. ..... 135/102; 135/88; 135/107; 135/120

[58] Field of Search ..... 135/4 R, 4 A, DIG. 1

[56] References Cited

U.S. PATENT DOCUMENTS

| | | | |
|---|---|---|---|
| 485,117 | 10/1892 | Vernon | 135/5.3 |
| 952,879 | 3/1910 | Crocker | 135/7.1 R |
| 1,463,499 | 7/1923 | Burroughs | 5/127 |
| 1,745,264 | 1/1930 | Margot et al. | 135/4 A |
| 2,041,336 | 9/1935 | Marthaler | 403/162 |
| 2,543,597 | 2/1951 | Peery | 135/7.1 R |
| 2,571,362 | 10/1951 | Hervey | 135/4 |
| 2,960,993 | 11/1960 | Holmstrom | 135/4 |
| 3,846,855 | 11/1974 | Peterson | 5/114 |
| 3,847,170 | 11/1974 | Anderson | 135/1 R |
| 3,848,279 | 11/1974 | Ipsen, Jr. | 135/DIG. 1 X |
| 3,886,609 | 6/1975 | Mackenzie | 5/110 |

FOREIGN PATENT DOCUMENTS

| | | | |
|---|---|---|---|
| 1076339 | 2/1960 | Fed. Rep. of Germany | 135/4 R |
| 1158913 | 2/1958 | France | 224/42.1 |
| 1313259 | 11/1962 | France | 135/4 R |
| 444722 | 3/1936 | United Kingdom | 135/4 R |
| 981293 | 1/1965 | United Kingdom | 135/4 R |

*Primary Examiner*—J. Karl Bell
*Attorney, Agent, or Firm*—Blodgett & Blodgett

[57] ABSTRACT

Compactible shelter consisting of a telescoping rectangular frame to the center of which are hinged a plurality of U-shaped roof elements covered by a flexible fabric.

6 Claims, 22 Drawing Figures

COMPACTIBLE SHELTER

Matter enclosed in heavy brackets [ ] appears in the original patent but forms no part of this reissue specification; matter printed in italics indicates the additions made by reissue.

BACKGROUND OF THE INVENTION

One type of equipment that is presently missing from the camping industry is a suitable general purpose shelter. The ideal shelter would be one which is light in weight, which is easily foldable into a compact condition, and one which may be used for a number of purposes, including a tent for human beings. Many attempts have been made in the past to satisfy this need, but in every case the resulting product has lacked one of the desirable qualities. Those shelters that do have most of the desirable qualities are complex in construction and very expensive.

Also, one activity that has developed considerable interest recently has been that of "back packing." This is a form of hiking and camping in which all of the sportman's equipment is carried in one pack on his back. While it is possible to carry a sleeping bag as part of this equipment, the addition of any kind of a tent or shelter (when added to the ordinary and necessary camping equipment) results in a load that is too great for long hikes. These and other difficulties experienced with the prior art devices have been obviated in a novel manner by the present invention.

It is, therefore, an outstanding object of the invention to provide a compactible shelter which is light in weight, simple in construction, and which is inexpensive to manufacture.

Another object of this invention is to provision of a compactible shelter forming part of a pack in which rigid portions of the shelter serve as the frame of the pack.

A further object of the present invention is the provision of a compactible shelter which has a simple general-purpose construction permitting it to be used for many applications where human beings and articles are to be protected from the weather.

It is another object of the instant invention to provide a shelter having a rigid frame constructed so as to be free of deterioration due to chemical and mechanical attack.

A still further object of the invention is the provision of a shelter for camping which has a manner of entry and exit which can be sealed when the shelter is occupied.

It is a further object of the invention to provide a compactible shelter which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a shelter having a rectangular frame with sides and ends and with hinges located at an intermediate portion of each of the sides. A plurality of U-shaped roof elements are mounted on the frame with their bights overlying the interior of the frame and the free ends of their legs pivotally attached to the hinges. A flexible member formed of water-proof fabric joins the frame and the roof elements.

More specifically, the rectangular frame consists of two U-shaped members. The legs of one U-shaped member is telescopingly received within the legs of the other U-shaped member, so that the frame can be reduced in size to a collapsed condition in which the bight of the said one U-shaped member lies adjacent the free ends of the other U-shaped member.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
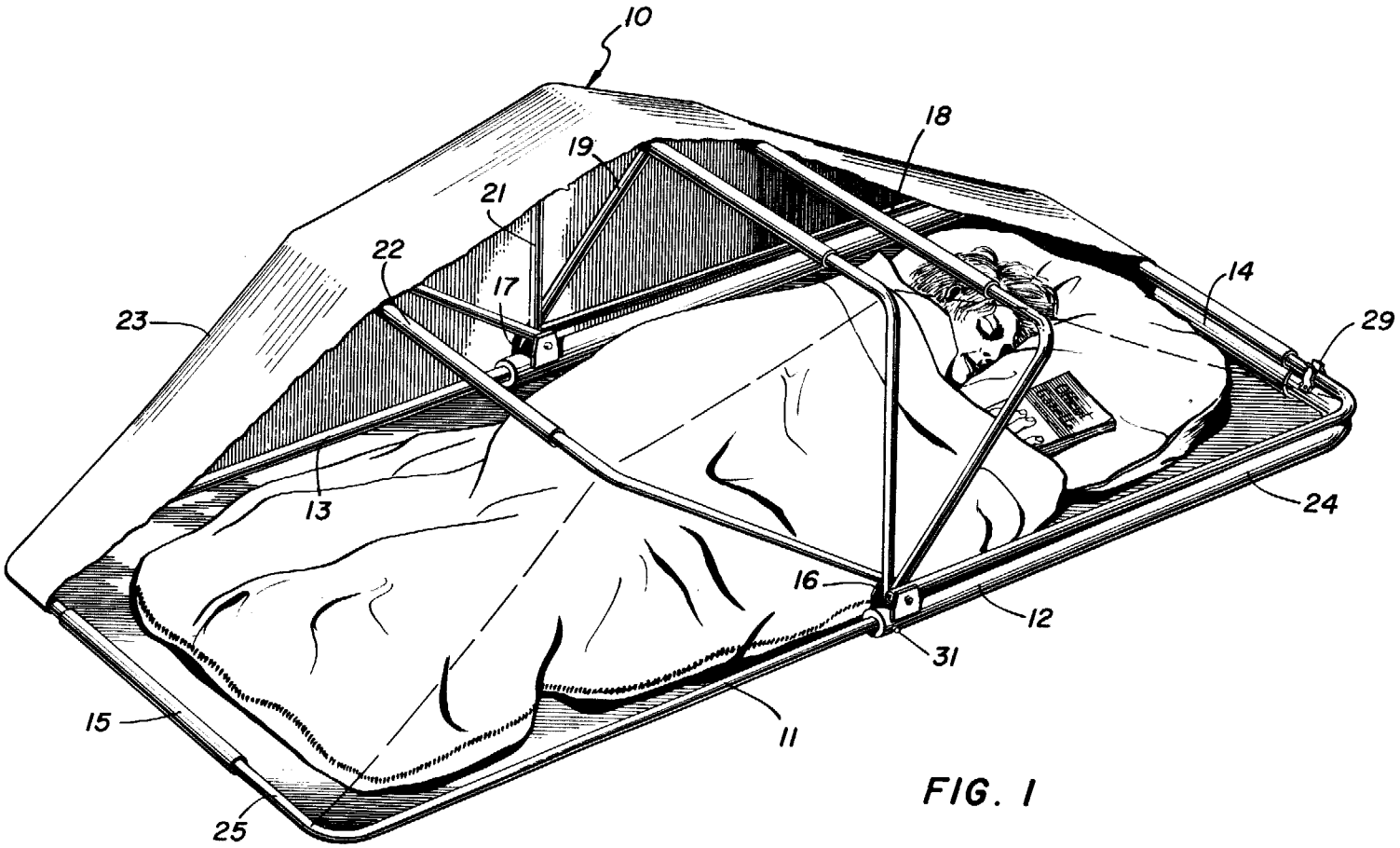
FIG. 1 is a perspective view of a compactible shelter embodying the principles of the present invention.

Referring first to FIG. 1, wherein is best shown the general features of the invention, the compactible shelter, indicated generally by the reference numeral 10, is shown in use with a person in a sleeping bag in its interior. The shelter consists of a rectangular frame 11, having sides 12 and 13, and ends 14 and 15 with hinges 16 and 17 located at the intermediate portions of the sides 12 and 13, respectively. A plurality of U-shaped roof elements 18, 19, 21, and 22 have their bights overlying the interior of the frame and have the free ends of their legs pivotally attached to the hinges 16 and 17. A flexible member 23 formed of waterproof fabric joins the frame and the roof elements. The flexible member 23 may also be made of wire screen to allow the invention to be used as a restraining device.

The rectangular frame 11 consists of two U-shaped members 24 and 25. The legs of the member 25 are telescopingly received within the legs of the other U-shaped member 24. In this way the frame can be reduced in size to a collapsed condition in which the bight of the said one U-shaped member 25 lies adjacent the free ends of the said other U-shaped member 24.

Figure 4:
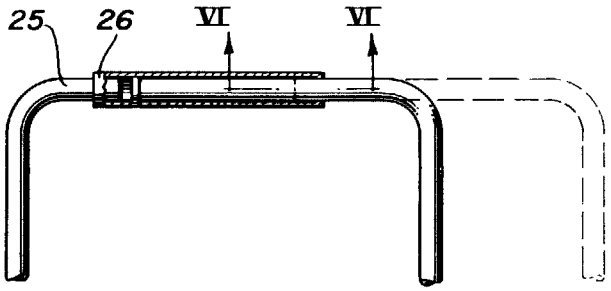
FIG. 4 is a plan view of a portion of the shelter.
Figure 6:
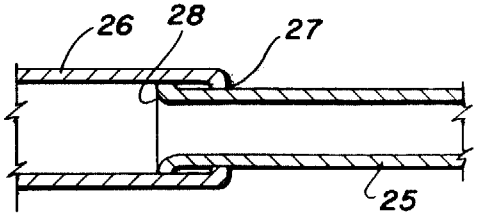
FIG. 6 is a sectional view of a portion of the shelter taken on the line VI—VI of FIG. 4.
Figure 3:
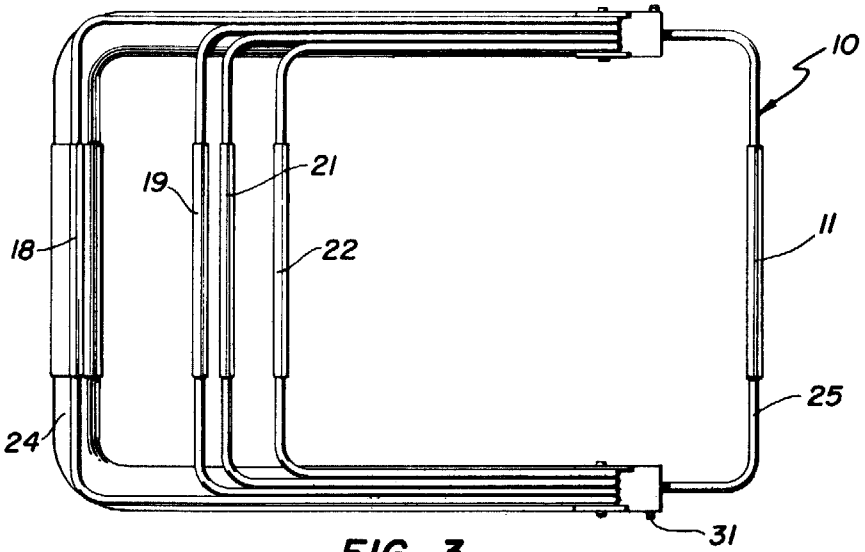
FIG. 3 is a plan view of the shelter in compacted condition.

The hinges 16 and 17 are fixed to the said other U-shaped member 24 at the said free ends of the legs, the roof elements 18, 19, 21, and 22 being nestable within the frame, as is evident in FIG. 3 in its inoperative condition. The bights of the U-shaped roof elements 18, 19, 21, and 22, as well as the bights of the U-shaped members 24 and 25 of the frame, are provided with a telescoping construction to permit their sidewise extension, the construction including a stop to limit such extension. FIG. 4 shows the way in which the member 25 is provided with a sleeve 26 to permit it to be extended. The stop is indicated in FIG. 6 and shows that the sleeve 26 is provided with an inwardly-directed flange 27 which engages an outwardly-directed flange 28 on the member 25, the two flanges striking to provide the stop mentioned above.

Figure 7:
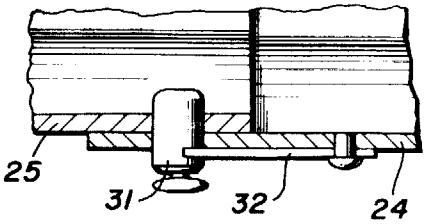
FIG. 7 is a horizontal sectional view through a detent forming part of the shelter.
Figure 2:
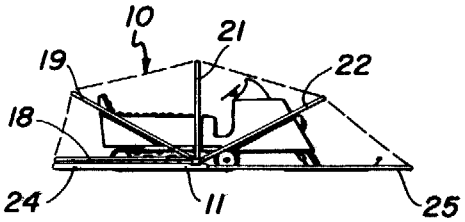
FIG. 2 is a front elevational view of the shelter.
Figure 5:
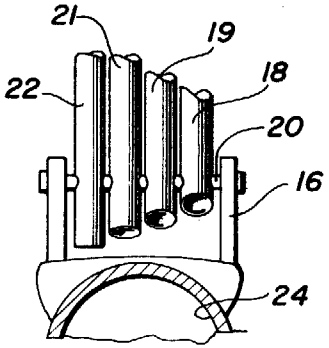
FIG. 5 is a vertical sectional view of a hinge portion of the shelter.

As is evident in FIGS. 1 and 2, the flexible member 23 is fixedly attached on one end to the bight of one of the U-shaped members 25 of the frame, and at the other bight of one of the U-shaped roof elements 18; this last named roof element being adapted to lie against the other of the U-shaped member 24, thus providing a means of entering and leaving the assembled shelter. Clips 29 are provided to lock the roof element 18 to the frame member 24 when they lie in face-to-face condition. The frame members 24 and 25 are held in their extended condition shown in FIG. 1 by use of detents 31 on either side. FIG. 7 shows the detail of the detent 31 and it shows a leaf spring 32 which maintains it in an inwardly-biased condition where it can lock into an aperture formed in the member 25. A similar arrangement is possible in which the spring is inside the member 25 and biased the detent outward through the apertures. FIG. 5 shows particularly well the manner in which the roof element 18, 19, 21, and 22 are pivoted in the hinge 16 on a shaft 20.

Figure 8:
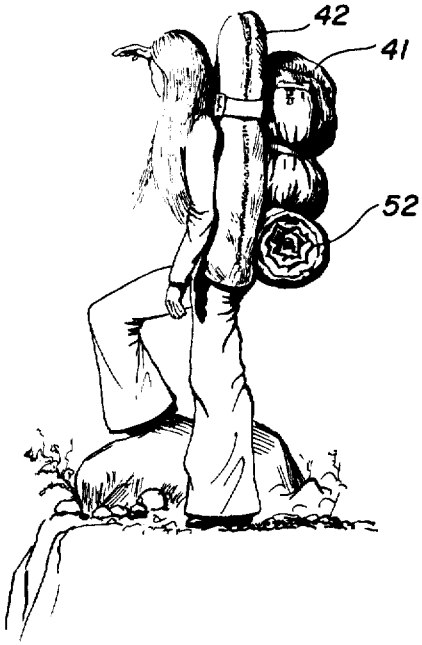
FIG. 8 is a perspective view of a modified form of the invention in use with a back pack.
Figure 9:
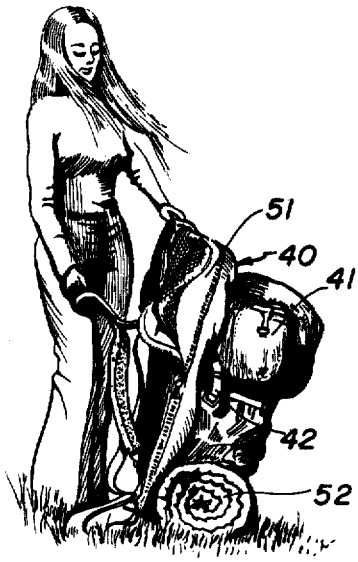
FIG. 9 is a perspective view showing the assembly of FIG. 8 partly set up.

FIGS. 8 and 9 show the manner in which a shelter 40 is combined with a pack 41 having shoulder straps 42. The shelter in compacted condition lies within a portion of the bag which rests against the users back and is zipped into place to act as the frame of the pack so that the pack (which normally consists only of bags without any rigid members) is provided with a rigid frame, so that its acts as a frame pack. This makes it much easier to carry the load; waist straps 42 can also be used to hold it in place, while provision is made for the use of accessory equipment, such as a sleeping bag 52 lying under the bag 51.

Figure 10:
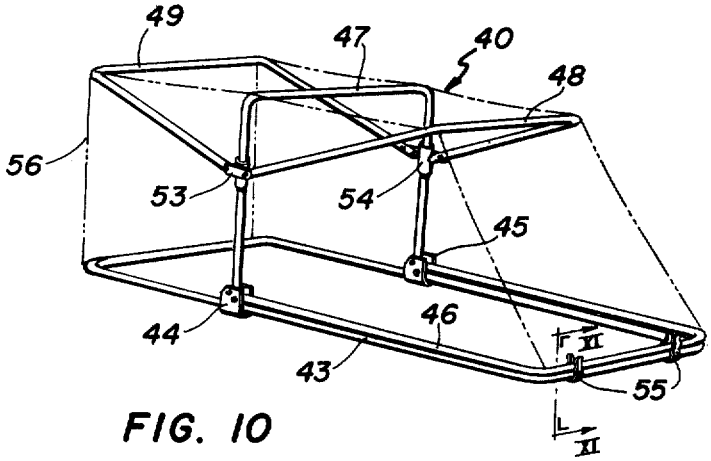
FIG. 10 is a perspective view of the shelter in operative condition.

Referring to FIG. 10 it can be seen that the shelter 40 is provided in the same way with a collapsible rectangular frame 43, having hinges 44 and 45 located on the outer edge of the U-shaped members making up the frame. Pivoted on the hinges 44 and 45 are U-shaped roof elements 46 and 47. Secondary hinges 53 and 54 are slidably mounted on the legs of the roof element 47 and are themselves attached to U-shaped roof elements 48 and 49 for pivotal action relative thereto. Clips 55 are provided on the frame 43 to hold the roof element 46 in fixed relationship to one end of the frame. A flexible member 56 extends from one end of the frame to the roof element 46 at the other end of the frame.

Figure 11:
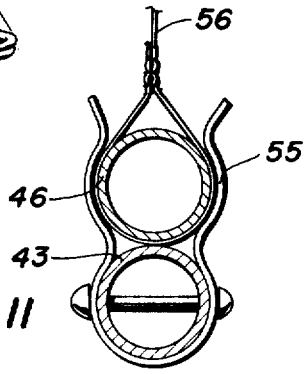
FIG. 11 is a vertical sectional view of a portion of the shelter taken on the line XI—XI of FIG. 10.

Referring to FIG. 11 it can be seen that the clips 55 are riveted to the frame 43 and the roof element 46 is held in the free legs of the clips 55 by spring action. The clip also, of course, engages the flexible member 56 where it is wrapped around the roof element. It can be seen that the bag 51 covers the frame and protects it and its associated elements from the weather, while providing capacity for other camping supplies.

Figure 12:
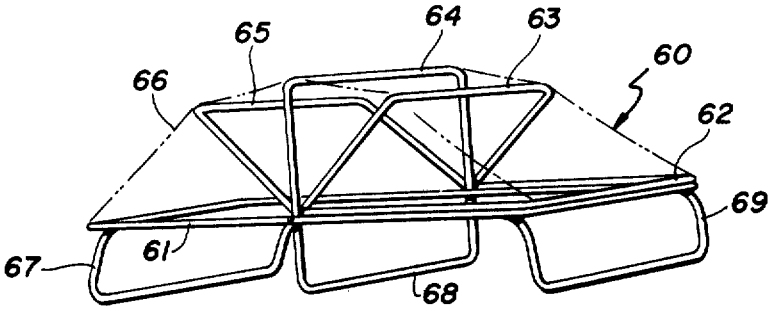
FIG. 12 is a perspective view of a modified form of the invention in use as the cot.

FIG. 12 shows the compactible shelter of the present invention used in the construction of a sleeping cot. The shelter 60 is provided with the collapsible frame 61 and with roof elements 62, 63, 64, and 65 hingedly attached to it and provided with the flexible member 66. U-shaped legs 67, 68, and 69 extend downwardly from the frame and are fixedly fastened thereto to hold the frame a substantial distance from the surface on which the apparatus rests.

Figure 13:
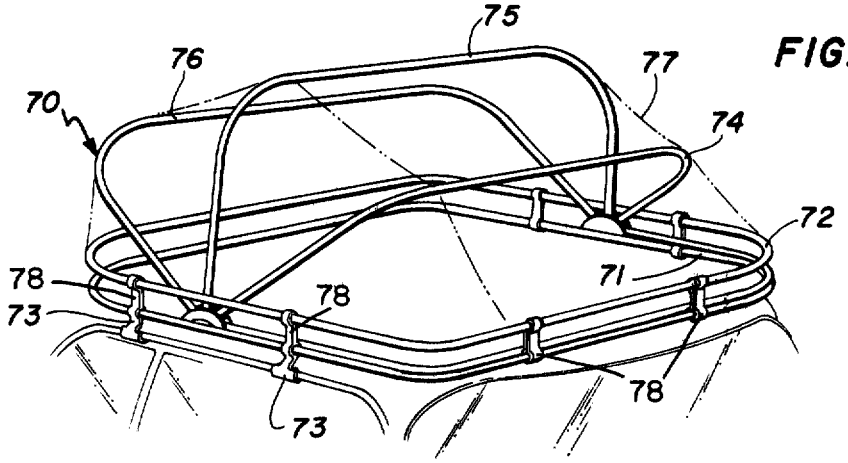
FIG. 13 is a perspective view of a modified form of the invention in use as a car top carrier.

FIG. 13 shows a modified form of the invention in which the shelter 70 is used as a carrier on the roof of an automobile. A frame 71 is provided with another similarly-shaped rectangular frame 72 located in spaced parallel relationship to it and held in that relationship by vertical connecting straps 78. Clamps 73 extend downwardly from [the frame] some of the straps for engagement with the roof of an automobile. Roof elements 74, 75, and 76 are hingedly connected to the frame. Over the frame and roof elements extends a flexible member 77 to protect the contents of the carrier from the weather.

Figure 14:
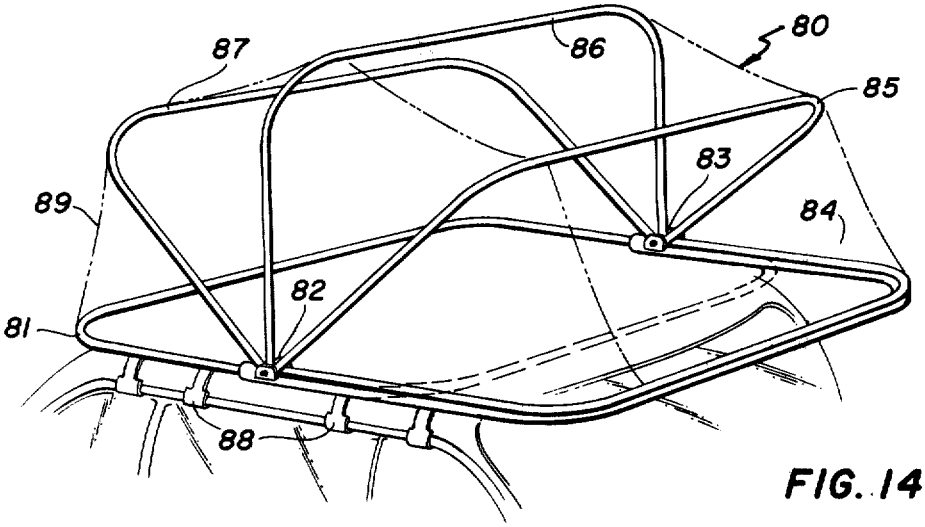
FIG. 14 is a perspective view of another modified form of the invention in use as a car top sleeper.

Referring to FIG. 14 a compactible shelter 80 is shown in the form of apparatus to permit sleeping on the roof of an automobile. The rectangular frame 81 consists of two U-shaped members telscopically connected together and provided with hinges 82 and 83 to carry the U-shaped roof elements 84, 85, 86 and 87. The frame is provided with downwardly-extending clamps 88 which permit it to be fastened to the rain gutter of a conventional automobile roof. The flexible member 89 joins the frame 81 and the roof elements 84, 85, 86, and 87.

Figure 15:
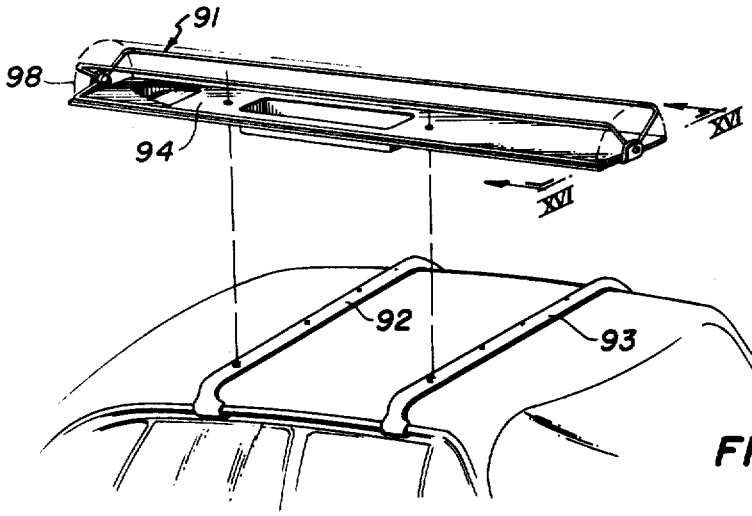
FIG. 15 is a perspective view of a modified form of the invention in use as a car top carrier for elongated articles, such as skis.
Figure 16:
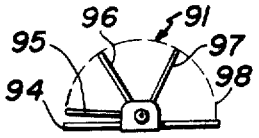
FIG. 16 is a side elevational view of the invention shown in FIG. 15 taken on the line XVI—XVI of FIG. 15.

FIGS. 15 and 16 show a compactible shelter 91 for use with automobile roof top racks 92 and 93 to enclose elongated articles such as a pair of skis. A rectangular frame 94 is provided with U-shaped roof elements 95, 96, and 97 on which is carried a flexible member 98.

Figure 17:
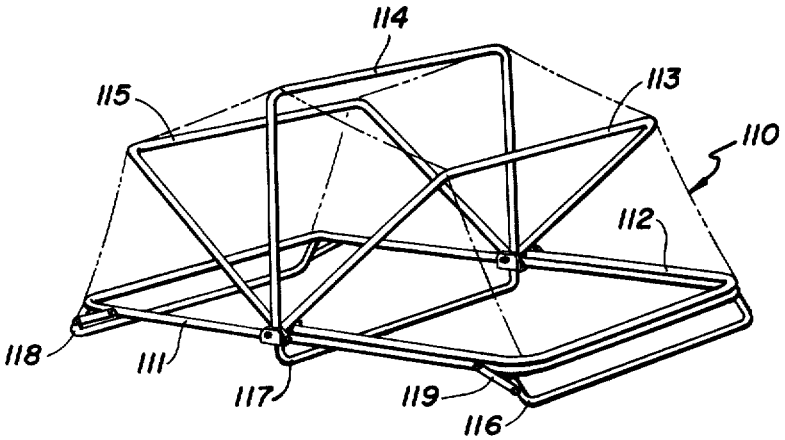
FIG. 17 is a perspective view of another modified form of the invention in use as a playpen for a small child.

Referring now to FIG. 17, a compactible shelter 110 is shown in use as a baby's playpen. The collapsible frame 111 has hingedly attached thereto the U-shaped roof elements 112, 113, 114, and 115. Hinged to the bottom of the frame 111 are U-shaped legs 116, 117, and 118 which are locked in place by means of articulated links 119 to hold the frame in spaced condition above the floor. A flexible cover joins the frame to the roof element.

Figure 18:
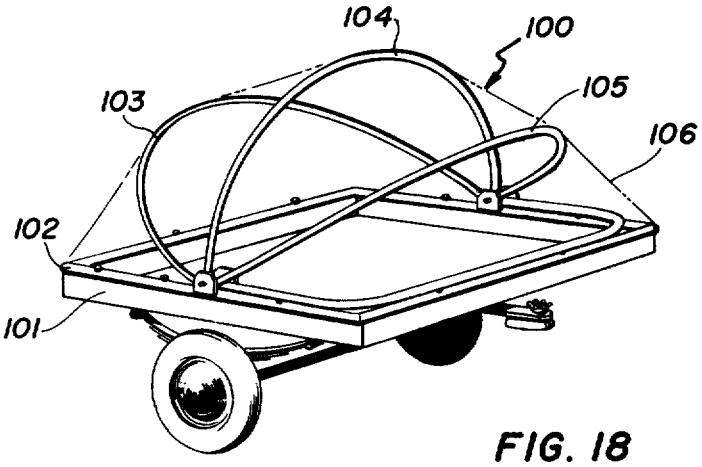
FIG. 18 is a persective view of another modified form of the invention in use as a protective shelter on an open trailer.

FIG. 18 shows a compactible shelter 100 arranged to be mounted on a trailer 101. A rectangular tubular frame 102 has U-shaped roof elements 103, 104, and 105 hingedly attached thereto and is provided with a flexible member 106.

Figure 19:
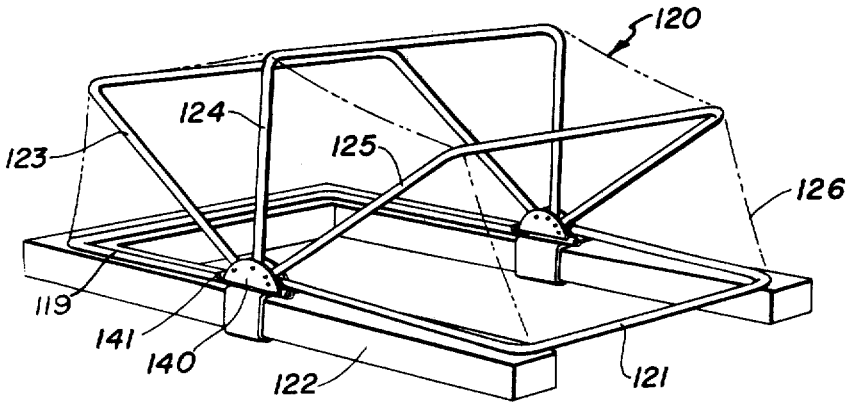
FIG. 19 is another modified form of the invention shown in use as a floating boat shelter.

FIG. 19 shows a compactible shelter 120 used to cover a boat. The [rectangular frame 121] *U-shaped frame member 119* is fastened to the upper surface of a U-shaped floatation member 122. U-shaped roof elements *121* 123, 124, and 125 are hingedly attached to the frame [121] *119* and are connected together by a flexible cover member 126.

Figure 20:
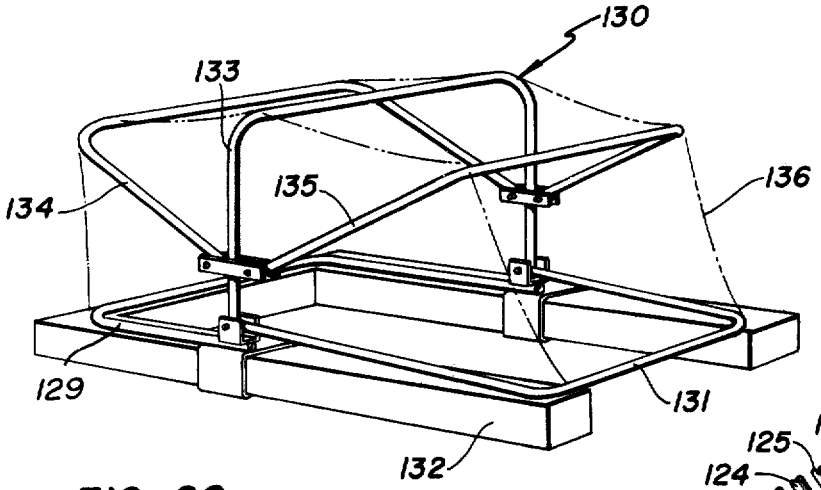
FIG. 20 is a still further modified form of the invention also shown in use as a boat shelter.

FIG. 20 shows a compactible shelter 130 of a modified type used for protecting a boat from the elements. The collapsible [rectangular] *U-shaped* frame [131] *129* is fastened to a U-shaped floatation member 132. Hingedly attached to the frame is a main U-shaped roof element 133 *a U-shaped element 131* and hingedly attached to an intermediate portion of the legs of the roof element 133 are U-shaped secondary roof elements 134 and 135, there being a flexible cover member 136 connecting the frame and the roof elements.

Figure 21:
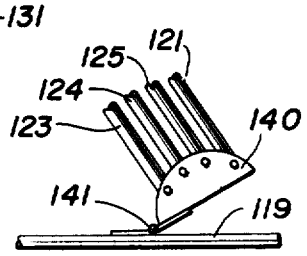
FIG. 21 is a detailed view of the hinge used in FIG. 19.

FIG. 21 shows a detailed view of a hinge element 140 which is used in FIG. 19. The roof elements *121* 123, 124, and 125 [and the frame 121] are pivoted in a common plane to hinge element 140. The hinge element is in turn hinged at hinge 141 to *the frame 119 which is connected to* the floatation member 122. This arrangement results in a slim profile connection which nevertheless allows complete opening and closing of the unit.

Figure 22:
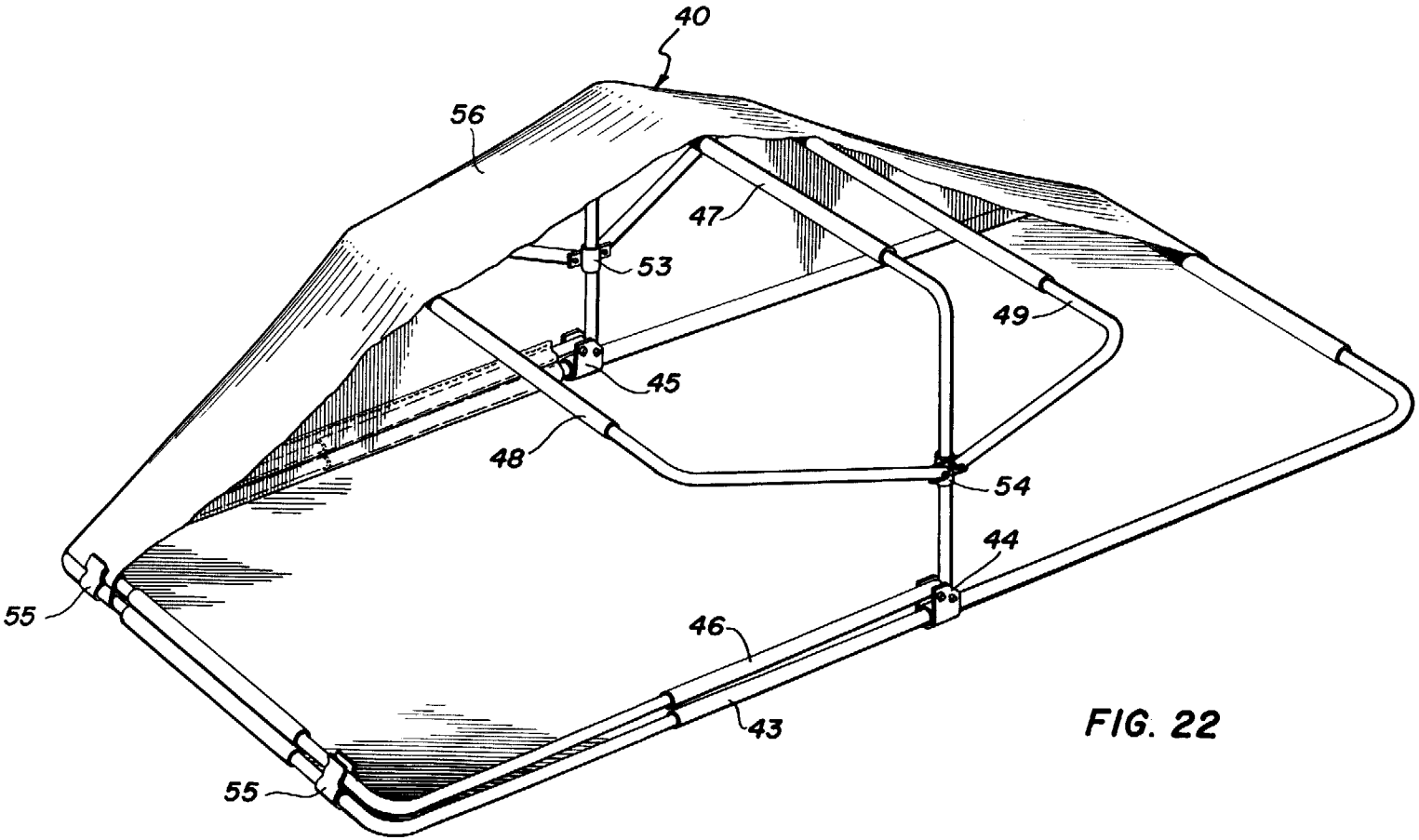
FIG. 22 is a detailed view of the form shown in FIG. 10.

FIG. 22 shows a more detailed view of the form of the invention shown in FIG. 10, particularly the telescoping relationship between the elements.

It is obvious that minor changes may be made in the form and construction of the invention without departing from the material spirit thereof. It is not, however, desired to confine the invention to the exact form herein shown and described, but it is desired to include all such as porperly come within the scope claimed.

The invention having been thus described, what is claimed as new and desired to secure by Letters Patent is:

1. Compactible shelter, comprising
   a. a rectangular frame having sides and ends,
   b. a hinge located at an intermediate portion of each of the sides,
   c. a plurality of U-shaped roof elements having their bights overlying the interior of the frame and the free ends of their legs pivotally attached to the hinges, and
   d. a flexible member formed of fabric joining the frame and the roof elements, the rectangular frame consisting of two U-shaped members, the legs of one U-shaped member being [telescopically] *telescopingly* received within the legs of the other U-shaped member, so that the frame can be reduced in size to a collapsed condition in which the bight of the said one U-shaped member lies adjacent the free ends of the said other U-shaped member, the flexible member being fixedly attached on one end to the bight of one of the U-shaped members of the frame and at the other end to the bight on one of the U-shaped roof elements, this last-named roof element being adapted to lie against the other of the U-shaped members of the frame, [this] *thus* providing a means of entering and leaving the assembled shelter, and means being provided to lock the two together when they lie face-to-face.

2. Compactible shelter as recited in claim 1, wherein the hinges are fixed to the said other U-shaped member at the said free ends of the legs, the roof elements being nestable within the frame at inoperative condition.

3. Compactible shelter as recited in claim 1, wherein the bights of the U-shaped roof elements and of the U-shaped members of the frame are provided with a telescoping construction to permit their extension, the construction including a stop to limit the extension.

*4. Compactible shelter, comprising:*

*(a) a rectangular frame having sides and ends,*

*(b) a hinge located at an intermediate portion of each of the sides,*

*(c) a plurality of U-shaped roof elements having their bights overlying the interior of the frame and the free ends of their legs pivotally attached to the hinges, and*

*(d) a flexible member formed of sheet material joining the frame and the roof elements, the rectangular frame consisting of two U-shaped members, the legs of one U-shaped member being received within the legs of the other U-shaped member, so that the frame can be reduced in size to a collapsed condition in which the bight of the said one U-shaped member lies adjacent the free ends of the said other U-shaped member, the flexible member being fixedly attached on one end to the bight of one of the U-shaped members of the frame and at the other end to the bight on one of the U-shaped roof elements, this last-named roof element being adapted to lie against the other of the U-shaped members of the frame, thus providing a means of entering and leaving the assembled shelter, and means being provided to lock the two together when they lie face-to-face.*

*5. Compactible shelter as recited in claim 4, wherein the hinges are fixed to the said other U-shaped member at the said free ends of the legs, the roof elements being nestable within the frame at inoperative condition.*

*6. Compactible shelter as recited in claim 4, wherein the bights of the U-shaped roof elements and of the U-shaped members of the frame are provided with a telescoping construction to permit their extension, the construction including a stop to limit the extension.*

* * * * *